(No Model.) 2 Sheets—Sheet 1.

R. M. HUNTER.
ELECTRICAL RAILWAY.

No. 571,832. Patented Nov. 24, 1896.

Attest
J. R. Maguire
E. M. Breckinreed

Inventor
Rudolph M. Hunter (No Model.) 2 Sheets—Sheet 2.
R. M. HUNTER.
ELECTRICAL RAILWAY.
No. 571,832. Patented Nov. 24, 1896.
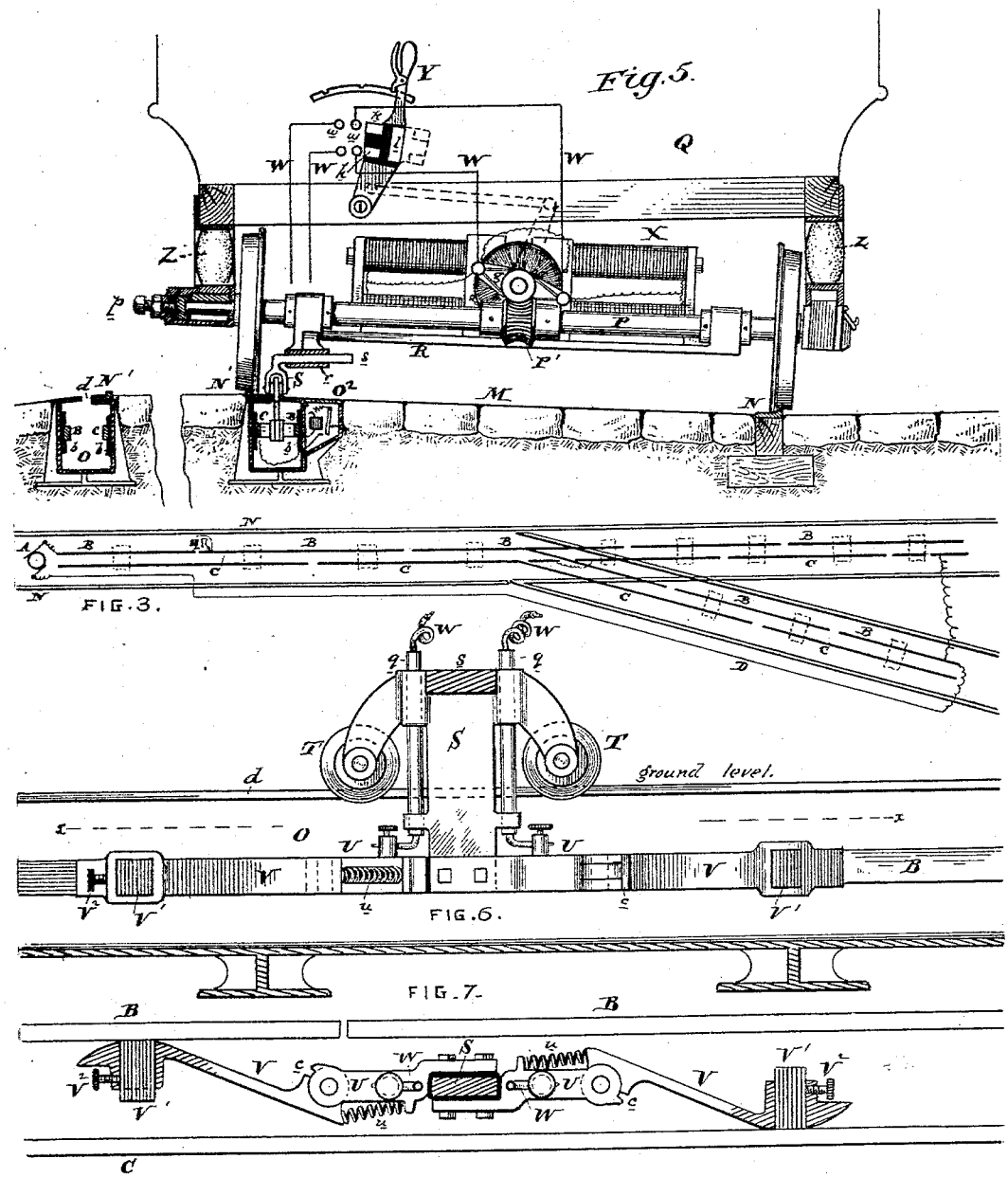
Attest
J. R. Maguire
E. W. Breckinreid
Inventor
Rudolph M. Hunter

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRICAL RAILWAY.

SPECIFICATION forming part of Letters Patent No. 571,832, dated November 24, 1896.

Application filed February 17, 1886. Serial No. 192,187. (No model.)

*To all whom it may concern:*

Be it known that I, RUDOLPH M. HUNTER, of the city and county of Philadelphia and State of Pennsylvania, have invented an Improvement in Electrical Railways, of which the following is a specification.

My invention has reference to electric railways; and it consists of certain improvements, which are fully set forth in the following specification and shown in the accompanying drawings, which form a part thereof.

Figure 1:
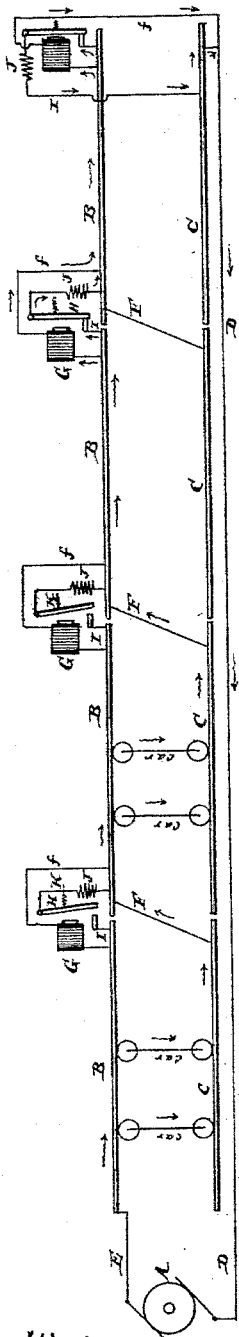
Figure 2:
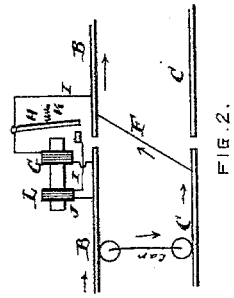
Figure 4:
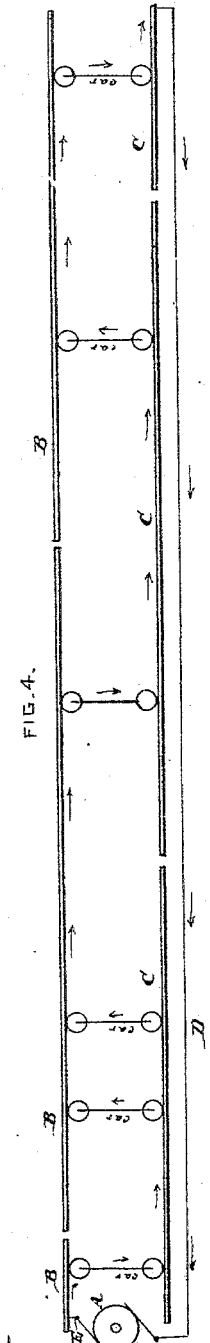

In the drawings, Figure 1 is a diagram illustrating my improved electric-railway system. Fig. 2 is a plan view showing the use of magnets of high and low resistance as applied to the system shown in Fig. 1. Fig. 3 is a diagram showing the arrangement of circuits of main track and branch track. Fig. 4 is a plan view or diagram showing the sectional system of working conductors for operating motors in multiple arc and series without the use of switches, the motors forming part of the circuit and the ends or breaks of the opposite working conductors staggered or arranged so that when a motor is in connection with one working conductor it may pass in successive connection with two of the opposite working conductors. Fig. 5 is a cross-section of roadbed and car, showing arrangement of conduit. Fig. 6 is a side elevation of the brush-holding mechanism. Fig. 7 is a sectional plan view of same on line $x\ x$.

A is the generator or dynamo-electric machine for supplying the current.

B and C are the positive and negative working conductors of the sections, of which there may be any number, and they may be of any length. One end of conductor B next to the generator is connected by wire E with one pole of the generator, and the similar end of the next section B is coupled with the adjacent end of the opposite conductor C by wire F. Each section is coupled in the same way, and the distant end of the last conductor C is connected with the other pole of the generator by wire D. Now if we put one or more motors on each section the circuit would be complete, but if a section was without a motor the circuit would be broken if some provision be not made to couple adjacent ends of conductors B B. This may be done in several ways.

Referring to Fig. 1, $f$ is a wire connecting the ends of the adjacent conductors B and has in its circuit an electromagnet G of sufficiently high resistance not to interfere with the current passing through motors when on the section. H is its armature and is drawn away from the magnet by a spring K and is connected to one of the adjacent conductors B. I is a shunt-circuit closed by the armature H. If now we suppose the motors on this section run onto the next section, the current passing through the magnet G would greatly increase, and the attraction of the magnet would overcome the spring K and close the shunt-circuit I, positively connecting the adjacent ends of conductors B of two sections, and the current is fed to the next section without having to cross to the conductor C of the previous sections. As a car is run onto the section just cut out the current divides, part passing to the conductor C, reducing the power of the magnet G and allowing the spring K to once more draw back the armature H and break the shunt-circuit I. A resistance J, inserted in the shunt I, so as to make the shunt of greater resistance than the motor, will insure the action of the magnet G being most positive, for if the spring K is to be more powerful than the magnet when the current divides with the motor in circuit, so as to open the shunt, it must be less powerful than the magnet when the motor is off and the shunt I is closed. When the shunt is closed, its resistance plus that of the magnet (being arranged in parallel) would not be as much as that of the motor. If desired, this resistance J may be applied in the form of a magnet, preferably of low resistance as compared with magnet G, as shown in Fig. 2, in which case it may be employed to assist the magnet G.

The railway may be constructed as desired, but in this application I will set out a construction of road-bed particularly adapted to wet climates.

Referring to Fig. 5, M is the roadway and is inclined, one rail, N', being higher than the other rail, N, so that all water will run from the upper rail toward the lower rail. If the streets have double tracks, then the highest rail of the other track would be next to the rail N', so that the roadway slopes from the center to the sides. Supporting the upper rail N', I provide a conduit-casting O, in which the positive and negative bared working conductors B C are secured, and said conduit is provided with a longitudinal slot d, arranged in its upper part. It must be borne in mind that I do not claim raising one rail higher than the other, broadly, as that is done in all railways on curves to overcome centrifugal force, but I do deem it broadly novel when applied to straight roads with the objects in view. The car-body Q is preferably horizontal, but the truck is supported at the same incline as the road-bed, as shown in Fig. 5, as it is necessary to have the wheels of the car of the same diameter. In practice this incline would be small, and is exaggerated in the drawings. Suitable thrust-boxes $p$ might be used to take the thrust of the car-body upon the upper ends of the axles. The body Q is supported upon the truck by springs Z. R is the motor-frame and is carried by the axles P and is provided with a guide-box $r$ directly under one of the axles. Guided in this guide-box is the slide $s$, to which is secured the vertical frame S, which extends down through the slot $b$ and carries the brushes.

T are guide-wheels having hubs, the thin portions of the peripheries running in the slot $d$, and are arranged one in front and one in the rear of the frame S, insuring it from scraping on the sides of the slot and also keeping the slot open. To the bottom of the frame S are secured the arms U, which are insulated from each other and from the frame, and said arms have hinged to them the brush-holders V, which preferably point in opposite directions and are pressed toward the conductors C D by springs $u$, and their movements toward the conductors are limited by stops $c$. The holders V have their ends curved so as to run in either direction and have slots through which the contact strips or brushes V'' pass and are clamped by the screws $V^2$.

Projecting down from the frame S at its upper part and extending through the slot $d$ of the conduit between the wheels T and the vertical part of the frame S are the tubes $q$, of any desired shape, through which the insulated conductors W pass, and which conductors are connected to the arms U or their brushes and convey the current to the motor on the car. The wheels T and frame S will prevent undue wear coming upon the tubes at their parts adjacent to the slot of the conduit, and the wheels T will support the collector vertically and prevent it projecting to too great a distance down into the conduit. These conductors W pass up to the motor X carried by the car and have their continuity broken and their ends terminating in contact-pieces $w$. A circuit-controller lever Y, having contact-plates $k$ and $l$, works over said contact-pieces $w$, so that the motor may be connected with the working conductors by bringing the plates $k k$ over the contact-pieces $w$, bridging the breaks in the wires W, or by shifting the plate $i$ so as to connect the two pieces $w$ of the conductors away from the motor the motor may be cut out and the continuity of the line series circuit be maintained. The motor may be of any desired construction.

The motor-shaft is shown as coupled with the car-shaft P by a worm and worm-wheel, but any other mode of coupling may be used, if desired.

The conductors B C may be secured to the walls of the conduit in any way as to secure insulation, and these walls may be provided with insulated coverings $b$, into or upon which the conductors are secured. The working conductors may be of copper bronze or other metal. The conduit is provided at the end of each section with boxes or cases $O^2$ with removable covers, in which the switch devices or circuit-controllers are located for protection.

While I prefer the constructions shown, I do not limit myself to the details thereof, as they may be modified in various ways without departing from my invention.

Having now described my invention, what I claim as new, and desire to secure by Letters Patent, is—

1. In an electric railway the combination of a slotted conduit extending along the railway, a bared conductor arranged within the conduit and insulated from it, an electrically-propelled car, a current-collecting device extending from the car down through the slot into the conduit making an electrical contact with the bared conductor and also having wheels resting and running upon the conduit at the top, a laterally-adjustable connection between the axle and collecting device for sustaining the collector in an upright position and positively moving it along the conductor independently of the vertical movements of the car-body, and a return-circuit from the car to the source of electric supply.

2. In an electric railway two working conductors made in sections, the opposite conductors of two adjacent sections being electrically connected together, a closed circuit connecting two adjacent sections on the same side, an electromagnet in said closed circuit, an armature for said electromagnet, a shunt-circuit connecting adjacent sections on the same side and adapted to be opened or closed by said armature, electric motors or locomotives electrically connected with said working conductors, and a source of electricity connecting with said conductors.

3. In an electric railway two working conductors made in sections, the opposite conductors of two adjacent sections being electrically connected together a closed circuit connecting two adjacent sections on the same side, an electromagnet in said closed circuit, an armature for said electromagnet, a shunt-circuit connecting adjacent sections on the same side and adapted to be opened or closed by said armature, a resistance in said shunt-circuit, electric motors or locomotives, and a source of electricity connecting with said conductors.

4. In an electric railway two working conductors made in sections, the opposite conductors of two adjacent sections being electrically connected together, a closed circuit connecting two adjacent sections on the same side, an electromagnet in said closed circuit, an armature for said electromagnet, a shunt-circuit connecting adjacent sections on the same side and adapted to be opened or closed by said armature, an electromagnet in said shunt adapted to attract said armature when the shunt is closed, electromotors or locomotives electrically connected with said working conductors, and a source of electricity connecting with said conductors.

5. The combination of two sectional conductors extending along an electric railway, each section of one conductor being electrically connected with the preceding section of the other conductor, locomotives in series in traveling connection with said conductors and circuit-controllers between the successive sections of one of the conductors, the said circuit-controllers consisting of a high and a low resistance magnet the high-resistance magnet being in a closed circuit and the low-resistance magnet being in an interrupted shunt-circuit closed by the armature which the magnets attract.

6. In an electric railway the combination of a slotted conduit extending along the railway, two longitudinal bared working conductors arranged within and insulated from the conduit, an electrically-propelled car having a body supported on springs, an independent frame carried by the axle independently of the body, a laterally-movable collector-frame laterally movable upon the independent frame and extending down into the conduit, two hinged contacts carried by the collector-frame arranged one in advance of the other, and springs pressing said contacts upon the respective conductors.

7. In an electric railway, the combination of a slotted conduit extending along the railway, conductors arranged within said conduit, an electrically-propelled vehicle, a supporting-frame sustained by the axle independent of the vehicle-body, a collector-frame sustained by the said supporting-frame independently of the axle, a contact carried by the collector-frame and spring-pressed into contact with the conductor, an electric motor on the car for propelling it receiving current from the collector-contact, and a return-circuit from the motor also extending along the railway.

8. In an electric railway, the combination of a bared conductor extending along the railway, car-axles and a car-body supported upon the axles by springs, a motor journaled by a frame to the axle to which it is geared and sustained independently of the car-body, a current-collector also carried by the axles independently of the car-body and making a traveling contact with the conductor extending along the railway, flexible electric-motor circuits extending from the collector to the car-body and including the motor, hand-controlled devices upon the car-body independent of the motor for controlling the current in the motor-circuit, and a return-circuit leading from the car to the source of electric supply.

9. In an electric railway the combination of a conductor extending along the railway, an electrically-propelled vehicle having wheels and axles and with a car-body supported upon springs, an electric motor geared to one of the axles for propelling the car, a current-collecting device projecting from the car and making a traveling contact with the conductor extending along the railway, a frame carried upon the axles independently of the car-body and its movements for supporting both the electric motor and the current-collecting devices, flexible circuits extending from the current-collecting device to the motor, and a return-circuit leading to the source of electrical energy.

In testimony of which invention I hereunto set my hand.

RUDOLPH M. HUNTER.

Witnesses:
E. M. BRECKINREED,
RICHD. S. CHILD, Jr.